No. 767,796. PATENTED AUG. 16, 1904.
G. A. CHADDOCK.
DOOR, WINDOW, OR LIKE APERTURE CLOSING DEVICE.
APPLICATION FILED OCT. 26, 1903.
NO MODEL. 6 SHEETS—SHEET 1.

FIG. 1.

No. 767,796. PATENTED AUG. 16, 1904.
G. A. CHADDOCK.
DOOR, WINDOW, OR LIKE APERTURE CLOSING DEVICE.
APPLICATION FILED OCT. 26, 1903.
NO MODEL. 6 SHEETS—SHEET 2.

No. 767,796. PATENTED AUG. 16, 1904.
G. A. CHADDOCK.
DOOR, WINDOW, OR LIKE APERTURE CLOSING DEVICE.
APPLICATION FILED OCT. 28, 1903.
NO MODEL. 6 SHEETS—SHEET 3.

Witnesses
Frank G. Brereton
Albert Popkins

Inventor
George Albert Chaddock
by Sturtevant & Greeley
Attys

FIG. 14a.

No. 767,796. PATENTED AUG. 16, 1904.
G. A. CHADDOCK.
DOOR, WINDOW, OR LIKE APERTURE CLOSING DEVICE.
APPLICATION FILED OCT. 26, 1903.
NO MODEL. 6 SHEETS—SHEET 6.

Witnesses
Frank G. Brereton
Albert Popkins

Inventor
George Albert Chaddock
by Sturtevant & Greeley
attys

No. 767,796. Patented August 16, 1904.

UNITED STATES PATENT OFFICE.

GEORGE ALBERT CHADDOCK, OF LIVERPOOL, ENGLAND.

DOOR, WINDOW, OR LIKE APERTURE-CLOSING DEVICE.

SPECIFICATION forming part of Letters Patent No. 767,796, dated August 16, 1904.

Application filed October 26, 1903. Serial No. 178,559. (No model.)

*To all whom it may concern:*

Be it known that I, GEORGE ALBERT CHADDOCK, master mariner, a subject of the King of Great Britain, and a resident of Knotty Ash, Liverpool, in the county of Lancaster, England, (whose post-office address is 56 Thomas Lane, Knotty Ash, Liverpool, aforesaid,) have invented certain new and useful Improvements in or Connected with Doors, Windows, or Like Aperture-Closing Devices, (for which application has been made in Great Britain, No. 23,564, dated October 28, 1902,) of which the following is a specification.

This invention relates to doors, windows, and the like aperture-closing devices of the kind in which the closing member or main portion of the door, window, or the like is constructed and mounted to have both a rotary and vertical movement, a sliding portion or shutter being in some cases provided having a vertical movement only to close the remaining space (if any) due to the vertical movement of the main portion.

According to the present invention I so mount the main portion or closing member as to have no movement of rotation in its upward vertical movement and to only partake of a rotary movement simultaneously with its downward movement—that is to say, I cause both the opening and closing rotations or swinging movements to take place during the downward movement of the closing member after it has been lifted, and I am thus enabled to utilize the whole or part of the weight of said member to produce both the opening and closing movements of rotation.

I attain the object of my invention by providing a straight vertical guide or guides to retain the closing member against rotation in its upward lift and helical or inclined guides communicating with said upward guides at or near the top and bottom, which when the closing member leaves or disengages from the upward guides after the upward lift are adapted to receive or engage the closing member and cause it to rotate or swing as it descends. If the closing member be designed to make a complete rotation within the aperture about a central axis, it will make a complete half-turn in one complete descent, in which it will have fully opened and fully closed. After being lifted in the upward guides for another opening and closing it will make a similar half-turn in the same direction on being allowed to descend. Where, however, the axis of rotation is located at one side or out of the center or where for the purpose of obtaining a tight joint of the closing member in the closed position its sides are made to overlap the sides of the aperture or are formed with rabbeted or beveled edges or otherwise adapted to fit to the frame or sides of the aperture to be closed, it is necessary to provide for the closing swing to act in an opposite direction of rotation to the opening swing. For this purpose I form or direct the helical or inclined guides first obliquely downward in one direction and then obliquely downward in an opposite direction. The point at which this change of direction of the guiding-track for the reversal of the swing is designed to take place may conveniently coincide with the midway position of the downward movement of the door; but in some cases this may be varied, so as to utilize a larger portion of the total downward movement for the closing (or opening) than for the opening (or closing) movement by making the oppositely-directed portions of the helical or inclined guides of different pitches or gradients. The effect of the varying pitch aforesaid is to produce a slow downward movement with a relatively quick opening swing, changing into a quick downward movement with a relatively slow closing swing, or vice versa. In any case whether equal or different pitches be utilized one or more portions of the track may be formed straight horizontally or vertically, and the track may be shaped so that the direction of swing is changed either gradually or more or less abruptly, as required. In this way the downward and swinging movements may be accelerated or checked or either movement be alone permitted or stopped at desired points, according to the form given to the downward guides.

I will now describe as an example the construction of one form of mechanism which I have designed for carrying out my invention as applied to bulkhead-doors, reference being had to the accompanying drawings, in which—

Figure 1 is a front elevation, Fig. 2 a sectional plan, and Fig. 3 a transverse vertical section, of a centrally-hung door having the features of my invention. Fig. 6 is an enlarged detail view of the bottom casing, showing the guiding device. Figs. 7, 8, and 9 are detail views of part of the closing member and shutter. Fig. 11 is a detail view of the seating and lifting racks. Fig. 14 is a front elevation, and Figs. 15 to 19 details, of a side-hinged door. Fig. 14$^a$ is an enlarged sectional side view of the stationary sleeve and its support.

Figure 1:
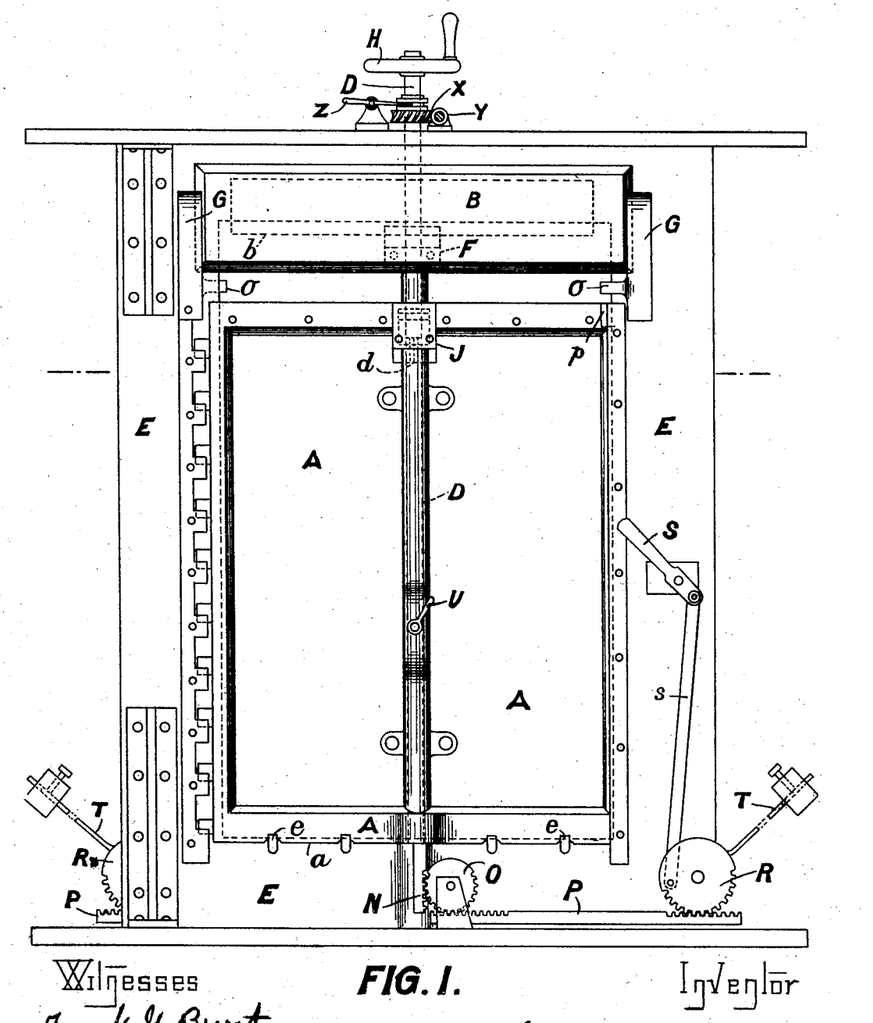
Figure 2:
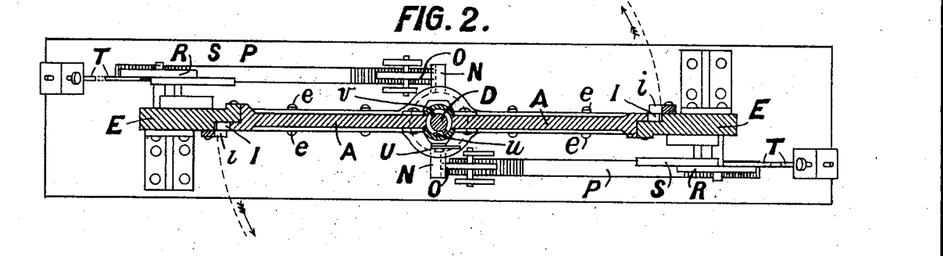
Figures 3, 8:
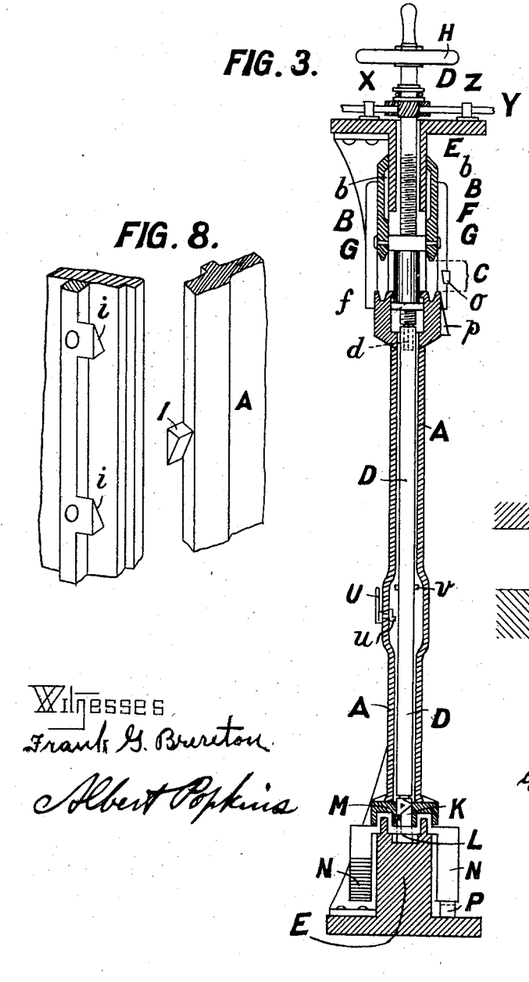
Figure 5:
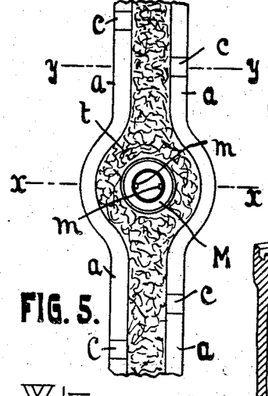
Fig. 5 is an enlarged plan of the under part of the closing member.
Figure 10:
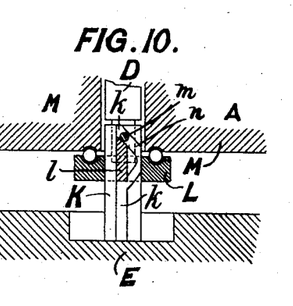
Fig. 10 is an enlarged sectional detail of the seating and guiding device.

I mount the closing member A, Figs. 1, 2, and 3, to be freely revoluble and vertically movable on or with a vertical shaft D, which is preferably mounted in the center of the width of the aperture, but may in some cases be placed at either side or more or less to one side, as required, and as shown, for example, in Figs. 14 to 19. I provide the aforesaid straight upward guides and helical or inclined downward guides for the closing member A by forming, for instance, grooves $k\ n$, Figs. 6 and 10, in the outer face of a stationary sleeve K, within which the shaft D rotates and which may itself form a footstep for said shaft. These grooves $k\ n$ are preferably arranged in pairs, of which one pair consists of two straight vertical grooves $k$, Fig. 6, on opposite sides forming an upward guide and the other pair of two helical or inclined grooves $n$, arranged one diametrically opposite the other between the grooves $k$ of the upward guide and forming the downward guide. In the drawings only one groove $n$ of the downward guide can be seen, the other groove being on the far side, but of exactly the same shape and disposition. The downward guide $n$ communicates with the upward guide $k$ at or near the top and bottom and may have its helical or inclined form varied or reversed in direction at desired points or be otherwise variously shaped, as before described, according to the nature of swing or rotation required to be imparted to the closing member. In the example shown in the drawings the downward guide $n$ has a $>$ form. On the closing member A, I provide a collar or sleeve or similar annular fitting M, Fig. 3, to engage over the stationary sleeve K and having inner projections $m\ m$, as shown in Fig. 5, to slide in the guiding-grooves $k\ n$ of said inner stationary sleeve, as shown in Fig. 10. In the closed position of the door, window, or the like these projections $m$ lie in the bottom of the straight grooves or upward guide $k$ and slide up same to prevent rotation of the closing member A when it is lifted; but when the latter is allowed to descend the said projections $m$, as shown in Fig. 10, pass out of the upward guide $k$ into the top of the shaped grooves forming the downward guide $n$ and are constrained by the latter to take such a path as will cause the closing member A to make an opening-and-closing swing as it descends. The member A will be fully open (at ninety degrees) when its projections $m$ are half-way down the grooves $n$. At this point the reversed direction of the grooves $n$ will cause the member A to swing back again while still descending until in the closed position the projections $m$ again enter the lower end of the upward guide $k$. It will be seen, therefore, that the closing member A not only swings open automatically after being lifted, but tends to always return to the closed position. Means may, however, be provided for checking or retaining it in the open position, such means being adapted to be released when the door is required to be closed, as will be hereinafter described.

Figures 6, 7, 11:
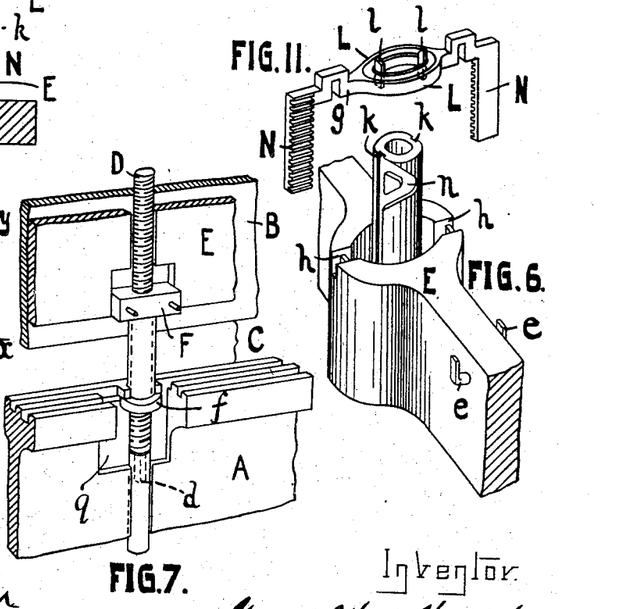

The means for effecting the upward lift of the closing member A must be designed to permit of the latter swinging about its vertical axis D under the action of the guides aforesaid when the member A descends. For this purpose I prefer to provide a seating in the form of a collar or other annular fitting L, Figs. 3, 10, and 11, mounted to slide on the aforesaid guiding stationary sleeve K, but below the aforesaid annular fitting M, provided on the closing member, these two fittings L M preferably having their opposing faces formed as a ball-race to receive balls, as shown in Fig. 10, whereby the closing member A may freely rotate, with its annular fitting M bearing on the lower fitting or seating L. The lower fitting L is provided with inner projections $l$, Fig. 11, to enter the upward guides $k$ of the stationary sleeve K below the corresponding inward projections $m$ of the upper fitting M, as shown in Fig. 10, and is thereby held against rotation. It may be further retained against rotation by outer projections or extensions $g$, Fig. 11, designed to work in vertical slots or grooves $h$, formed in the walls of a socket or recess which receives the stationary guiding-sleeve K and may form part of the sill E or bottom casing of the aperture to be closed, as shown in Fig. 6. The said lifting-seat L may be actuated by any suitable means to raise and lower the closing member A for opening and closing, said means consisting, preferably, of lifting mechanism having a quick return in order to allow of the downward movement and corresponding opening and closing movements of the closing member taking place in a self-acting manner tending to normally close the door. For this purpose I provide the outer projections or extensions $g$ of the seating L with vertical racks N N, Figs. 11 and 12, preferably two, arranged diametrically one opposite the other, and provide pinions O O, Figs. 1 and 2, to gear with said racks N and with horizontally-sliding racks P P, which latter extend to opposite sides, where they are engaged with other pinions R R. These latter pinions R are connected by rods $s$ or other intermediate gear with small levers or hand-pulls S, provided on the inside and outside of the closing member A and located conveniently to hand in such a way that a pull on either lever S will by means of the rack-and-pinion gearing lift the lower seating L, and therewith the closing member A, which is guided by the upward guide $k$. Upon the pull on said lever S being relaxed, the seating L drops and the closing member A, now guided by the downward guide $n$, descends and performs an opening-and-closing swing. Of course only one hand-lever S and its gear need be provided if the door or window is not to be operated from both sides.

Figure 12:
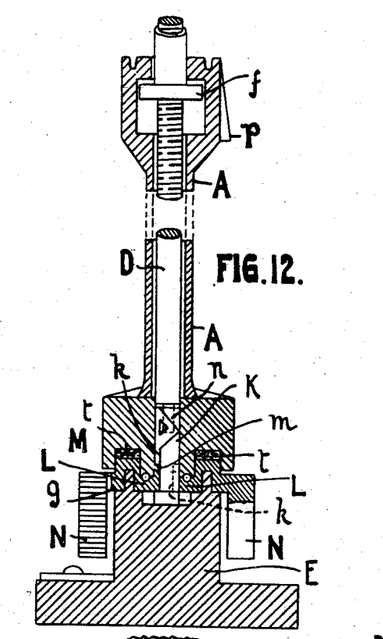
Fig. 12 is an enlargement of part of Fig. 3 in section on line $x\ x$ of Fig. 5, showing packing.

The means for insuring that the inward projections $m$ of the annular fitting M of the closing member A will pass out of the vertical guide $k$ at or near the top into the downward guide $n$ may be variously arranged. For example, the inner projections $l$ of the lower seating L, Fig. 11, which are of such length as to always remain in the upward guide $k$, may have their upper ends extended and beveled somewhat to form an incline toward the entrance to the downward guide, as shown in Fig. 11, in such a way that when the seating L is lifted the closing member A in being carried upward therewith is supported not directly on the seating, but by means of its inner projections $m$ resting on the top of the aforesaid projections $l$ of the seating L, as shown in Fig. 10, until when the upper end of the guide $k$ is reached and the projections $m$ on the closing member A come opposite the communicating point with the downward guide $n$ they roll or slide off the top beveled edge of the lower projections $l$ into the downward guide $n$, and the lower seating L, (or ball-bearing, if such be provided,) which is preferably provided with counterweights, as will be hereinafter described, now supports the closing member A and is borne down by the weight of the latter. Further, I may provide engaging devices $o$ $p$, Fig. 3, at the edges of the closing member A and casing formed with inclined faces, so disposed, as shown, that at the completion of the upward lift these parts or faces $o$ and $p$ engage and impart a slight opening swing to the closing member sufficient to bring its inner projections $m$ into the downward guide $n$, and in such case the aforesaid beveled formation of the upper ends of the projections $l$ of the lower seat L may or may not be dispensed with. In practice I prefer to use the incline devices $o$ $p$ without the beveled formation of the projections $l$. When reaching the bottom of the downward guide $n$, the projections $m$ drop naturally into the lower part of the upward guide $k$, as shown in Fig. 12.

My invention enables the whole or part of the weight of the door, window, or the like to be counterbalanced when desired. This is of great advantage in the case of large or heavy structures, and particularly in the case of bulkhead-doors of ships. For this purpose I may provide any known mechanism; but preferably I provide the aforesaid pinions R, Fig. 1, which are operated by the hand pull or lever S, with a weighted arm or lever T, the weight of which is so selected and adjustably mounted on the arm as to act to assist the pull on said hand-lever S to lift the closing member A on the seating L and counterbalance its weight in both the upward and downward movements to the required extent. Usually I allow a small excess of weight in favor of the closing member A, just sufficient to actuate the self-acting downward and swinging movements of opening and closing hereinbefore described. In this way the closing member A can be operated with great facility, and even in cases of considerable weight the operation requires relatively small exertion on the part of people operating the same.

It will be seen that in order to pass through the door a person has only to give an easy pull on the hand-lever S to lift the member A, and then the moment the lever S is released the member A will fall and swing open. In this position the member A is retained by hand as the person walks through; but it immediately falls farther and closes again as soon as the hand is withdrawn from it.

Where it is desired to provide means for securing the closing member in any required open position, I may use locking or clamping devices adapted to be readily released. In the case of bulkhead-doors, however, or other cases where it is desired to have a number of closing devices under the control of a central station to enable a number of such closing devices to be closed simultaneously such a form of locking means for retaining the member A in the open position (at ninety degrees) must be selected which cannot only be released locally, but also from the central control. For this purpose I pivotally mount on the face of the closing member a small lever U, Figs. 1 and 3, having an eccentric or other projection $u$ within the hollow center of the door and adapted (when the lever U is turned) to engage against a stud or projection $v$ on the vertical shaft D, lying within this hollow center, the parts being so located that in one position of the lever U its inner projection $u$ engages the projection $v$ of the shaft D when the closing member A has swung open ninety degrees, (in which position it has only dropped one-half its full downward movement,) and thus prevents the further closing rotation. When, however, the door is required to be closed, this may be effected either locally by turning the lever U to bring its projection $u$ clear of the projection $v$ on the shaft D, thus allowing the downward closing swing of the door to be completed, or by central control by giving the vertical shaft D a partial rotation to turn its projection $v$ away from the projection $u$ of the lever U, the vertical shaft D being connected by suitable shafting and gearing to the central station. When the release has been effected by a partial rotation of the shaft D, the member A cannot be secured in the open position by any turning of the lever U until the shaft D has been again turned to bring its pin $v$ back into its stopping position, as before, which cannot be done by any person in the compartment closed by the member A, and the latter, therefore, while being free to open always closes in a self-acting manner until the officer in charge of the central control permits the door to be locked open. Usually I prefer to connect the central-control shafting Y, Figs. 1 and 3, to the vertical shaft D by means of worm-gearing X in order to insure that the vertical shaft D would be held against rotation until operated from the central station.

The closing member A if mounted to swing about an axis located on either side may be made of such height relative to the aperture to be closed that an open space is not left at either the upper or lower end by its vertical movement. Usually, however, I prefer to allow for such a space C, Figs. 1 and 3, being left at the upper end for the purpose of ventilation, this space being closed by a vertically-sliding shutter B, operated by means of a screw-thread on the vertical shaft D. In the example shown the shutter B consists of two plates arranged on each side of the casing E, as shown in Fig. 3, held together by bolts in a central block F, and each plate may have a recess $b$, Fig. 4, in its inner face to receive some packing material. The shutter B is guided at each end in grooved guides G, Fig. 1, and the block F is internally threaded to act as a nut on the screw-thread of the shaft D to enable the latter to operate the shutter B, as before stated.

Figures 4, 13:
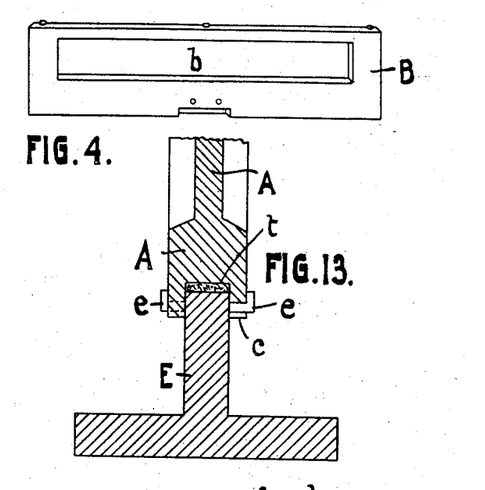
Fig. 4 is a detail view of one plate of the shutter.
Fig. 13 is a section on line $y\ y$ of Fig. 5.

When it is desired to insure a state of prepared security in an emergency, such as an anticipated inrush of water into a ship, the closing actuation of the sliding shutter B is effected from the central station by the officer on the bridge, for example, causing the vertical shaft D to rotate, first, however, giving a partial rotation to said shaft to release the locking-lever U and enable all the closing members A to swing to the closed position if they were at the time in an open position, and then (either immediately or after a suitable lapse of time has been allowed for people to escape) imparting continual rotation to the shaft D to lower the shutter B and by mechanical pressure bind the whole closing device tightly all round. In the drawings I have shown wedge-shaped fastenings I on the edges of the member A to engage behind similar wedge-fastenings $i$ on the side casings E, as shown in Figs. 1, 2, and 8, to force the member A with a wedging action against the casing E when it is pressed down by the shutter B. Figs. 5, 12, and 13 show how packing $t$ may be inserted to further insure a tight closing at the bottom.

To enable the sliding shutters or lifting and depressing devices and the like to be actuated locally as well as centrally, I may provide the vertical shaft D of each closing member A at the upper or lower end with hand-gear H for rotating it; but in such cases the worm-gearing X, whereby the vertical shafts D of the closing devices are geared to the shafting Y from the central station, is provided with a shipper-fork Z, Fig. 1, or clutch mechanism whereby it may be thrown out of gear temporarily with the central-station shafting Y during the local operation. In this way any one or more of the doors may be closed without closing all.

In practice the closing member A will not be allowed to drop fully into its seating in the self-acting closure, but will be supported on a flange of the block F of the shutter to prevent a firm binding of the whole structure each time it is closed normally without mechanical pressure of the shutter. This is shown in Figs. 3 and 12, in which the member A is revolubly hung on the flange $f$ of a sleeve extended from the block F of the shutter B. In this position the lifting of the door by the hand-lever S for the opening and closing movement is facilitated, as the edges of the door do not bind in the fastenings I $i$, which would otherwise make it difficult to open the joint at the bottom and sides. When, however, the shutter is lowered to bind all in a tight joint, the flange $f$ lowers the closing member fully into its fastenings or jointing devices, and the shutter or the like can press it home to make a tight joint.

Figure 9:
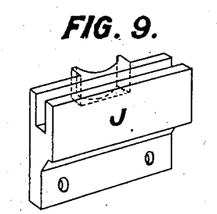

To enable the vertical shaft D to be mounted and dismounted readily, it may be made in two parts, coupled together at $d$, Figs. 3 and 7, for instance, by a squared end on one part entering a corresponding socket in the other part or in other manner, and the top of the closing member A may have a recess $q$ at this part, Fig. 7, which is covered by a removable piece J, Fig. 9, to afford access.

Figures 14, 15, 16:
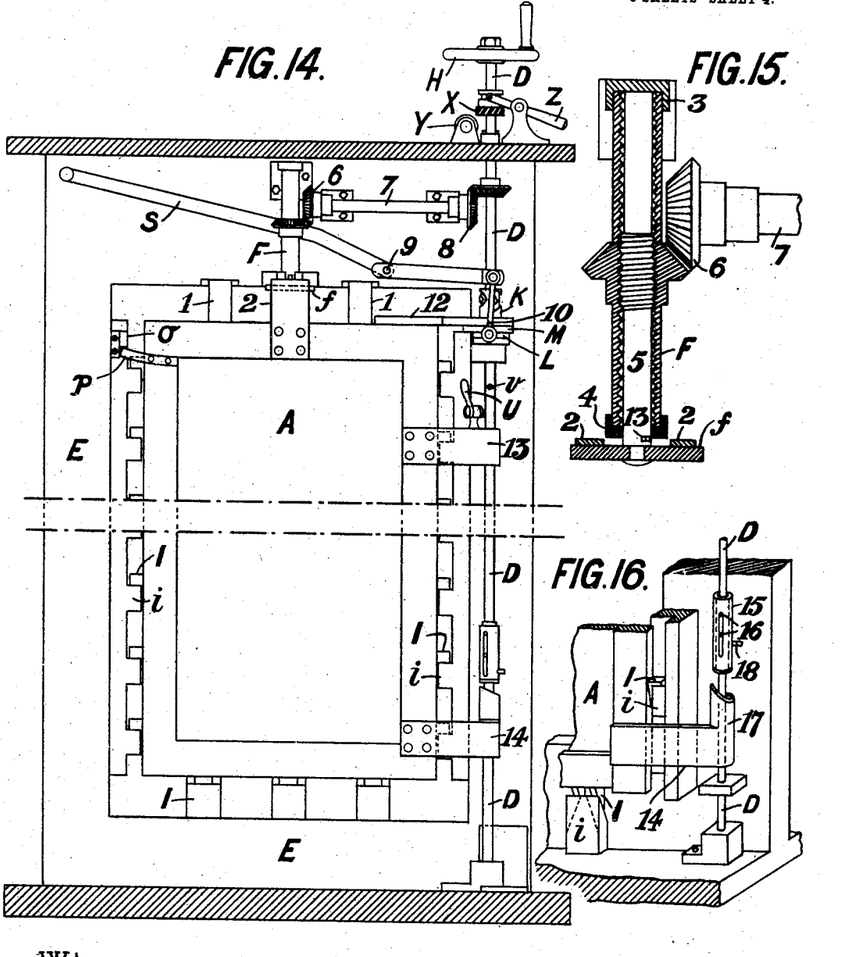
Figure 14A:
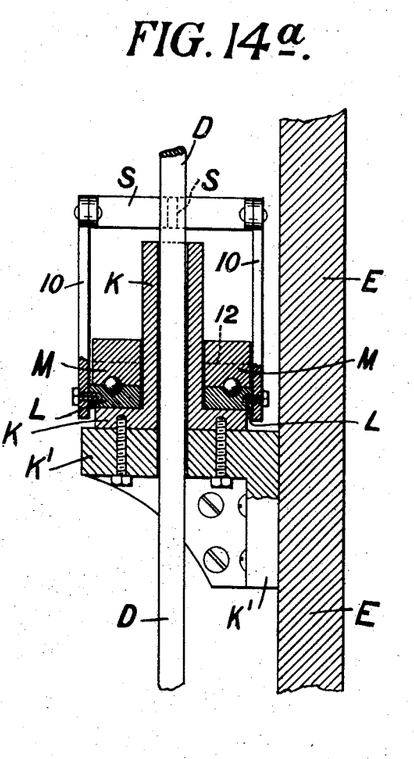
Figure 17:
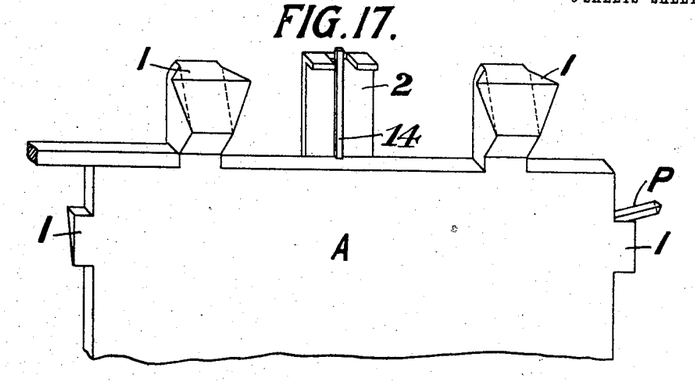
Figure 18:
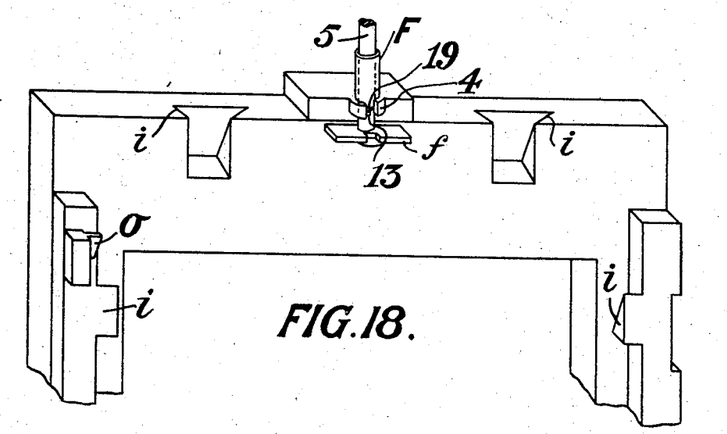
Figure 19:
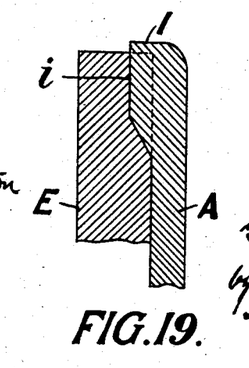

In the case of side-hinged doors or the like the shutter B is preferably dispensed with, and the flange $f$, before described, for suspending the closing member A may be utilized as a central depressing device without the shutter. It is necessary, however, that side-hinged doors or the like should be adapted to disengage from the central depressing device for the opening swing. An example of such a side-hinged door with central suspending and depressing device is shown in Figs. 14 to 19, in which 2, Fig. 17, is a forked plate on the closing member A to engage over the shoulder *f*, Fig. 15, in the closed position of the door, Fig. 14, which swings on hinges 13 and 14. The shoulder *f* may be carried by a nut or sleeve F, as before described with reference to Fig. 7; but preferably I mount the nut or sleeve F to revolve in bearings 3 and 4, Fig. 15, without vertical movement and provide within it a threaded shaft 5, which carries the shoulder *f* for lifting and suspending or depressing the door A. The sleeve F is rotated by bevel-gear 6 and shaft 7, operated by bevel-gear 8 from the shaft D, Figs. 14 and 15. This rotation of the sleeve F moves vertically the threaded shaft 5, which is held against rotation—for example, by a pin 13 thereon engaging with either side of a spline 14, Fig. 17—in the closed position of the door. The bearing 4 is cut away at 19, Fig. 18, to allow the spline 14 to enter. The door A is mounted on a stationary sleeve K, which is bolted to a rigid bracket K', as shown in Fig. 14ᵃ, to act as before described and is opened by lifting it by means of the hand-operated lever S, pivoted at 9 Fig. 14, and connected by links 10 or other device to the lifting-seat L. An upper hinge or bracket 12 of the door is formed integral with or connected to the upper seating M, which bears on the seating L, as before described. The action is the same as that before described for the centrally-hung door except that I have here shown the door without a counterbalancing mechanism, and it requires no further description. With side-hinged doors, however, it is necessary to have some means of forcing the door to swing into the closed position (if held open by a list or some unusual circumstance) before it can be finally forced down into its fastenings by the depressing device 5. For this purpose in the construction shown I provide a sleeve 15 on the shaft D, Fig. 16, which is held against rotation thereon with limited vertical play by means of pins 16 on the shaft engaging through a slot in the sleeve 15. On the hinge 14 I provide a socket or projection 17 to engage over the sleeve 15 when the door is up and open. The projection 17 has an inclined upper end which in said position engages below a pin 18 on the sleeve 15, and the latter is selected of such a weight as will cause the pin 18 to bind on the inclined top of the projection 17 when the shaft D is rotated in such a way that the shaft D, sleeve 15, and projection 17 must all turn together, thereby starting the closing swing of the door A against any undesired resistance. If, however, the door at this moment be strongly held against closing by any person desiring to pass through, this extra resistance will be such as to cause the pin 18 to no longer bind, but to slip up the inclined top of the projection 17 and ride over the latter as the sleeve 15 lifts. In this way the rotation of the shaft D will not force the door to close upon a person passing through, as the pin 18 slips over the top of the projection 17 on each rotation of the shaft D until the person allows the door to close, whereupon the pin 18 will again bind and force the door to close against any accidental resistance weaker than the pull of a person should such be resisting its self-acting closure. The weight of sleeve 15 and angle of the top of projection 17 may be varied to cause this compulsory closing of the door to take effect against any given resistance, but to yield to any larger resistance, or if the pin 18 be mounted directly on the shaft D to engage the projection 17 the compulsory closing would act against any resistance likely to be presented.

In counterbalancing the weight of the closing member in its vertical movements I may use any suitable or known means, such as a forked lever engaging the lower seating L or other part at one end and carrying a counterweight at the other end. This device may be linked or connected directly with the hand-lever S for the lifting operation instead of the rack-and-pinion gear before described and will be preferable for doors and the like which are hung at or near one side.

The joints at the sill or bottom of the closing member A and also, if desired, between the shutter B and top of said member A are preferably formed with the grooved or recessed face on the upper part and the related projecting edge to fit therein on the under part to avoid the grooves or recesses being choked by matter dropping into them. The double flange or walls *a* of the recess may be slotted, as shown at *c*, Fig. 5, to drop over large-headed or hooked studs *e* on the sill E, Figs. 1, 6, and 13, and strengthen the locking effect in the fully-closed position.

It will be readily understood that the operating and guiding devices may be located at other positions than those described and that details of construction may be modified as required to suit each case without departing from the spirit of the invention.

I declare that what I claim is—

1. In a door, window, or like aperture-closing device revolubly mounted within the aperture on a vertical axis with vertical play thereon, the combination with means for lifting said closing member and permitting it to descend, of means for guiding and retaining it in a plane parallel to that of the aperture in its upward movement, and means for guiding it into an opening and closing swing about its vertical axis in its descending movement, substantially as described.

2. In a door, window, or like aperture-closing device revolubly mounted within the aperture on a vertical axis with vertical play thereon and of lesser height than the aperture, the combination with means for lifting said closing member and permitting it to descend, of means for guiding and retaining it in a plane parallel to that of the aperture in its upward movement, means for guiding it into an opening and closing swing about its vertical axis in its descending movement, a shutter mounted with vertical play at the head of the aperture, and means for moving said shutter vertically to open or close the space remaining at the top, substantially as described.

3. In a door, window, or like aperture-closing device revolubly mounted within the aperture on a vertical axis with vertical play thereon, the combination with means for lifting said closing member and permitting it to descend, of a stationary sleeve located in said vertical axis and having upward and downward guides for the closing member, the upward guide being straight vertically to retain the closing member in a plane parallel to that of the aperture in its upward movement and the downward guide being shaped to direct the closing member into an opening and closing swing about the vertical axis in its descending movement, substantially as described.

4. In a door, window, or like aperture-closing device revolubly mounted within the aperture on a vertical axis with vertical play thereon, the combination with means for lifting said closing member and permitting it to descend, of means for guiding and retaining it in a plane parallel to that of the aperture in its upward movement, and means for guiding it into an opening swing of ninety degrees about its vertical axis in a partial descent, and for guiding it into a closing return swing of ninety degrees in a further completing descent, substantially as described.

5. In a door, window, or like aperture-closing device revolubly mounted within the aperture on a vertical axis with vertical play thereon, the combination with means for lifting said closing member and permitting it to descend, of a stationary sleeve located in said vertical axis, said sleeve having an upward guide $k$ and a downward guide $n$ on two opposite sides, and the closing member engaging with and guided by the guide $k$ in its upward movement, and by the guide $n$ in its downward movement, substantially as described for the purpose stated.

6. In a door, window, or like aperture-closing device revolubly mounted within the aperture on a vertical axis with vertical play thereon, the combination with means for lifting said closing member and permitting it to descend, of means for guiding and retaining it in a plane parallel to that of the aperture in its upward movement, means for guiding it into an opening and closing swing about its vertical axis in its downward movement, and means for imparting a slight opening swing on the completion of the upward lift to bring the member out of control of the upward-guiding means into control of the downward-guiding means substantially as described.

7. In a door, window, or like aperture-closing device revolubly mounted within the aperture on a vertical axis with vertical play thereon, the combination with means for lifting said closing member and permitting it to descend, of a stationary sleeve located in said vertical axis and having upward and downward guides, projections on the closing member engaging with said guides, and projections with inclined faces at the edges of the closing member and its casing to one engage the other and impart a slight opening swing to the closing member on completion of its upward lift to bring its projections out of control of the upward guide into control of the downward guide, substantially as described.

8. In a door, window, or the like aperture-closing device revolubly mounted within the aperture on a vertical axis with vertical play thereon, the combination of a vertically-movable lifting-seat mounted concentrically to said vertical axis, in position to engage and lift the closing member, means for lifting said seat and therewith the closing member, and permitting same to descend, means for guiding and retaining the closing member in a plane parallel to that of the aperture in its upward movement, and means for guiding it into an opening and closing swing about its vertical axis in its descending movement, substantially as described.

9. In a door, window or like aperture-closing device revolubly mounted within the aperture on a vertical axis with vertical play thereon, the combination with the closing member of a stationary sleeve located in said vertical axis, said sleeve having an upward guide $k$ and a downward guide $n$ both on two opposite sides, an annular lifting-seat vertically movable on said sleeve in position to engage and lift the closing member, means for vertically moving said lifting-seat to lift the closing member (or permit it to descend) and projections on the closing member engaging said upward guide in the upward movement of the closing member, and engaging said downward guide in the descending movement, substantially as and for the purpose stated.

10. In a door, window or like aperture-closing device revolubly mounted within the aperture on a vertical axis with vertical play thereon, the combination with means for lifting said closing member and permitting it to descend, of means for guiding and retaining it in a plane parallel to that of the aperture in its upward movement, means for guiding it into an opening and closing swing about its vertical axis in its descending movement, and means for more or less counterbalancing the weight of the closing member, substantially as described.

11. In a door, window or like aperture-closing device revolubly mounted within the aperture on a vertical axis with vertical play thereon, the combination of lifting-seat L, sleeve K having an upward guide $k$ and a downward guide $n$, an annular fitting M on the closing member having projections $m$ to engage said upward and downward guides, projections $l$ on the seating L to engage the upward guide below the projections $m$, rack-and-pinion gear adapted to be operated by hand to lift the seat L, and therewith the door and to permit same to descend, and counterweighted means acting with a lifting tendency on the said seating to more or less counterbalance the weight of the closing member, substantially as described.

12. In a door, window or like aperture-closing device revolubly mounted within the aperture on a vertical axis with vertical play thereon, the combination of means for lifting and suspending the closing member within its fastenings, said means being adapted to depress said member to produce a tight closing, means for further lifting said closing member and permitting it to descend onto said suspending means, means for guiding and retaining it in a plane parallel to that of the aperture in its upward movement, and means for guiding it into an opening and closing swing about its vertical axis in its descending movement, substantially as described.

13. In a door, window or like aperture-closing device revolubly mounted within the aperture on a vertical axis with vertical play thereon, the combination with means for lifting said closing member and permitting it to descend, of means for guiding and retaining it in a plane parallel to that of the aperture in its upward movement, means for guiding it into an opening swing about its vertical axis in a partial descent, and for guiding it into a closing return swing in a further completing descent, and means for retaining the closing member against said completing descent to hold it in the swung-open position, said retaining means being adapted to be released to permit the further completing descent for the closing swing, substantially as described.

14. In a door, window or like aperture-closing device revolubly mounted within the aperture on a vertical axis with vertical play thereon, the combination with means for lifting said closing member and permitting it to descend, of means for guiding and retaining it in a plane parallel to that of the aperture in its upward movement, means for guiding it into an opening and closing swing about its vertical axis in its descending movement, a vertical shaft revolubly mounted in said vertical axis, a pin on said vertical shaft, a lever revolubly mounted on the closing member and having an eccentric projection adapted to engage said pin and retain said closing member after the latter has made a partial descent into a swung-open position, said lever being adapted to be turned to carry its eccentric projection out of engagement with said pin to permit a further completing descent for the closing swing, and means for turning said shaft to carry its pin out of engagement with said eccentric projection of the lever to render said retaining-lever inoperative as regards the self-acting closing movement of the closing member substantially as described.

15. In a door, window or like aperture-closing device revolubly mounted within the aperture on a vertical axis with vertical play thereon, the combination of a closing member having its vertical axis of swing located to one side, means for lifting and suspending said closing member within its fastenings, said means being adapted to depress the closing member, and a forked engaging piece on the closing member engaging said suspending and depressing means in the closing swing of the member and disengaging in the opening swing, substantially as described.

16. In a door, window or like aperture-closing device revolubly mounted within the aperture on a vertical axis with vertical play thereon, the combination of a closing member having its vertical axis of swing located to one side, a vertical shaft located in said axis, a sleeve mounted with limited vertical play on said shaft to turn therewith, a pin on said sleeve, and a socket or projection carried by the closing member adapted to engage over said sleeve when the door is up and open, said projection having an incline at its upper end adapted in said position to engage below said pin on the sleeve, the sleeve being selected of such a weight as will cause the pin to bind on said incline when the shaft is rotated, and start the closing swing of the door against a given resistance, but to yield and ride over the incline when the closing of the door meets a greater resistance, substantially as described for the purpose stated.

17. In a door, window, or like aperture-closing device revolubly mounted within the aperture on a vertical axis with vertical play thereon, the combination with means for lifting said closing member and permitting it to descend, of means for guiding and retaining it in a plane parallel to that of the aperture in its upward movement, means for guiding it into an opening swing about its vertical axis in a partial descent, and for guiding it into a closing return swing in a further completing descent, a vertical shaft revolubly mounted in the axis of swing, a pin on said shaft, means adapted to engage said pin and retain the closing member against said completing descent to hold it in the swung-open position, a hand-lever on the closing member adapted to be turned to disengage said retaining means and permit the further completing descent for the closing swing, a central-control shafting for rotating said vertical shaft to carry its pin out of position to be engaged by said retaining means and render same inoperative, means for throwing said shafting into and out of gear with the vertical shaft, and means for rotating said vertical shaft independently of said shafting, substantially as described.

18. In a door, window, or like aperture-closing device revolubly mounted within the aperture on a vertical axis with vertical play thereon, the combination of a vertical shaft revolubly mounted in said axis, means actuated by said shaft to lift and suspend the closing member within its fastenings, said means being adapted to depress said member to produce a tight closing, means for further lifting said closing member and permitting it to descend onto said suspending means, means guiding and retaining it in a plane parallel to that of the aperture in its upward movement, means for guiding it into an opening swing about its vertical axis in a partial descent, and for guiding it into a closing return swing in a further completing descent, a pin on the vertical shaft, means adapted to engage said pin and retain the closing member against said completing descent to hold it in the swung-open position, a hand-lever on the closing member adapted to be turned to disengage said retaining means and permit the further completing descent for the closing swing, a central-control shafting for rotating the vertical shaft to carry its pin out of position to be engaged by said retaining means, and render same inoperative, means for throwing said shafting into and out of gear with the vertical shaft, and means for rotating said vertical shaft independently of said shafting, substantially as described.

19. In a door, window, or like aperture-closing device revolubly mounted within the aperture on a vertical axis with vertical play thereon, and of lesser height than the aperture, the combination of a vertical shaft revolubly mounted in said axis, a shutter mounted with vertical play at the head of the aperture, means carried by said shutter actuated by said shaft to lift and suspend the closing member within its fastenings, said means being adapted to carry said shutter with it vertically to open or close the space remaining at the top and to depress said member to produce a tight closing, means for further lifting said closing member and permitting it to descend onto said suspending means, means for guiding and retaining it in a plane parallel to that of the aperture in its upward movement, means for guiding it into an opening swing about its vertical axis in a partial descent, and for guiding it into a closing return swing in a further completing descent, a pin on the vertical shaft, means adapted to engage said pin and retain the closing member against said completing descent to hold it in the swung-open position, a hand-lever on the closing member adapted to be turned to disengage said retaining means and permit the further completing descent for the closing swing, a central-control shafting for rotating the vertical shaft to carry its pin out of position to be engaged by said retaining means, and render same inoperative, means for throwing said shafting into and out of gear with the vertical shaft, and means for rotating said vertical shaft independently of said shafting, substantially as described.

In witness whereof I have hereunto signed my name, this 10th day of October, 1903, in the presence of two subscribing witnesses.

GEORGE ALBERT CHADDOCK.

Witnesses:
HARRY MANLEY,
JOHN A. MIDDLETON.